July 26, 1966 W. R. AIKEN 3,263,120
SOLID STATE DISPLAY PANEL HAVING DELAY LINE
CONTROL OF PANEL ELEMENTS
Filed Nov. 13, 1962 4 Sheets-Sheet 1

INVENTOR.
WILLIAM ROSS AIKEN

BY

ATT'YS

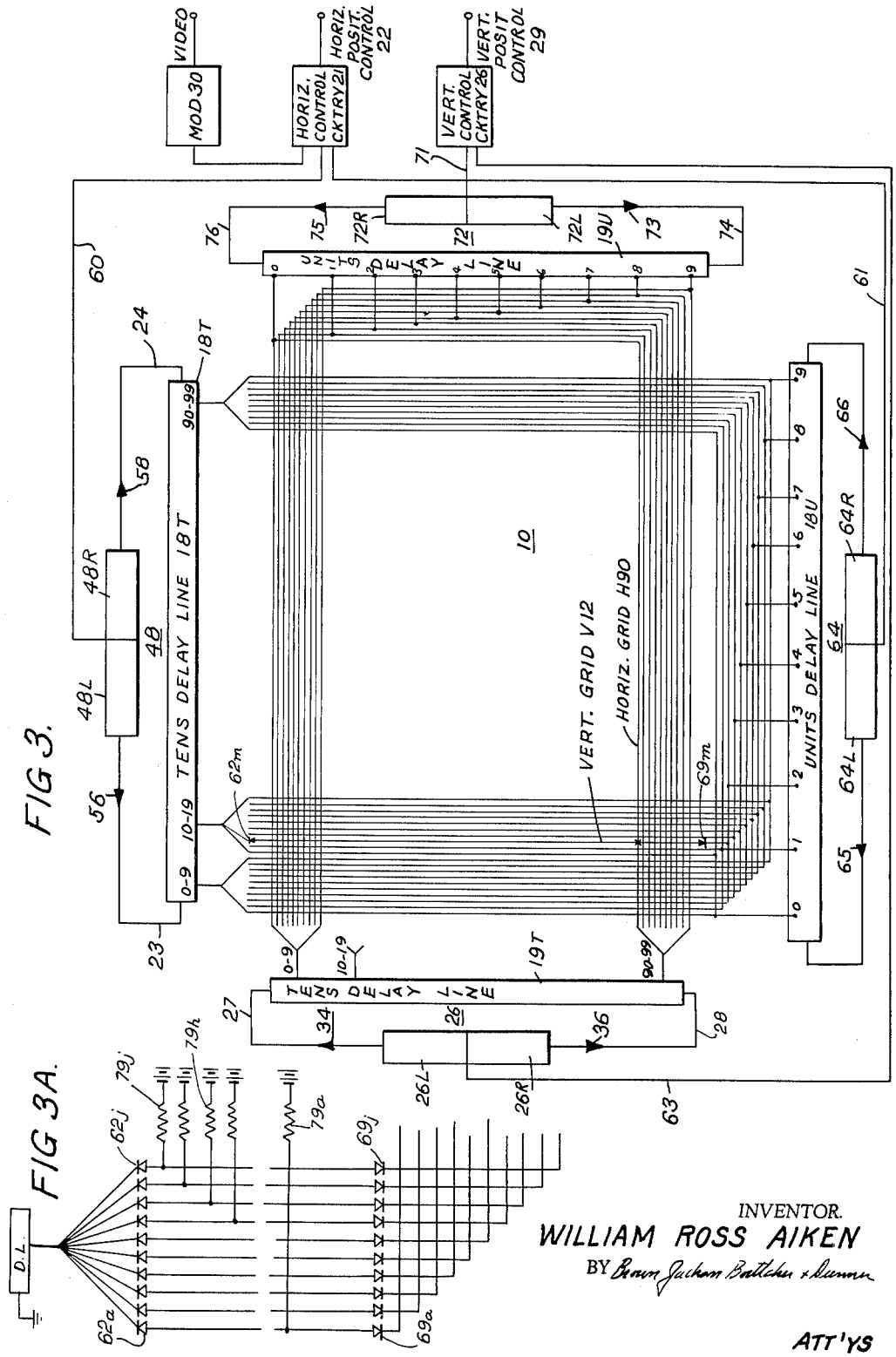

July 26, 1966 W. R. AIKEN 3,263,120
SOLID STATE DISPLAY PANEL HAVING DELAY LINE
CONTROL OF PANEL ELEMENTS
Filed Nov. 13, 1962 4 Sheets-Sheet 3
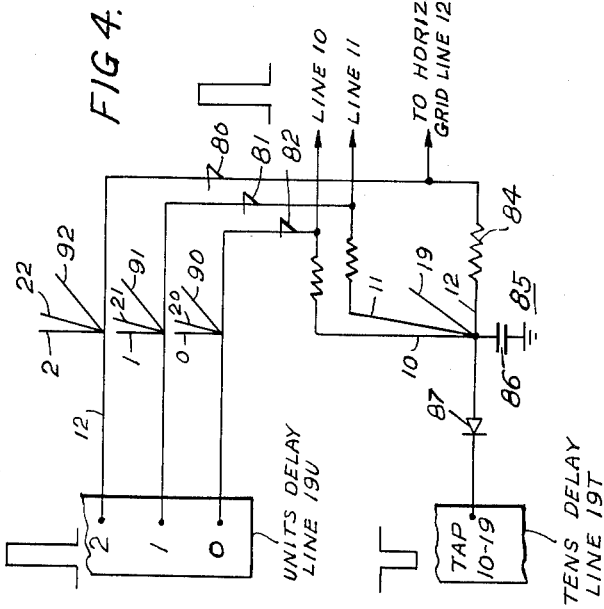
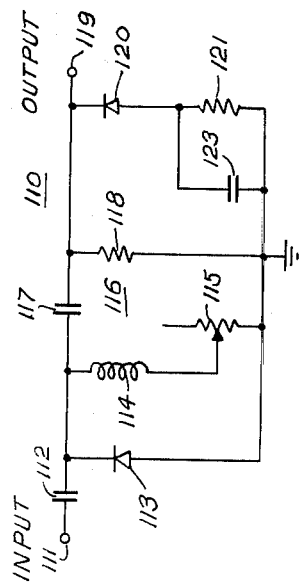
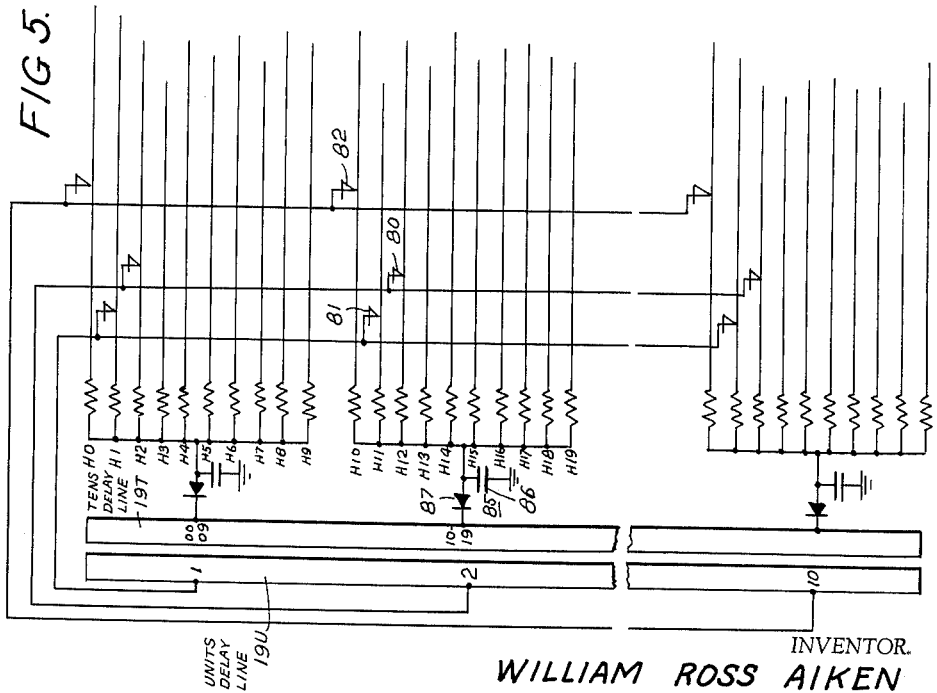
INVENTOR.
WILLIAM ROSS AIKEN
BY Brown Jackson Boettcher & Dienner
ATT'YS

United States Patent Office 3,263,120
Patented July 26, 1966

3,263,120
SOLID STATE DISPLAY PANEL HAVING DELAY LINE CONTROL OF PANEL ELEMENTS
William Ross Aiken, Los Altos, Calif., assignor, by mesne assignments, to Kaiser Aerospace & Electronics Corporation, Oakland, Calif., a corporation of Nevada
Filed Nov. 13, 1962, Ser. No. 237,226
14 Claims. (Cl. 315—169)

It is an object of the present invention to provide a novel switching circuit for a display device, and more specifically to provide a novel switching method and apparatus for providing separate and independent excitation of minute areas of a two-dimensional solid state matrix or continuum.

There is, and has been, a definite need for a device which is operative as a transducer to convert an electrical input to an optical output primarily adapted for visual observation. In recent years considerable effort and expense have been spent in the advancement and development of many different types of display media including the solid state, liquid, gas, evacuated, mechanical and other types of structures. A comprehensive review of the state of the display art was published in the IRE proceedings, volume 48, pages 1380–1394 (August 1960), and such review includes an extensive bibliography of the different forms of solid state panel devices which have been and are being considered.

One of the more promising developments in recent years comprises an electroluminescent cell which is made of a thin layer of an electroluminescent phosphor (such as zinc oxide, cadmium oxide, zinc sulphide, etc., several mils in thickness) disposed between and in sandwiched relation with two sets of parallel conductors, the set of parallel conductors disposed on one side of the phosphor being oriented at right angles to the set of conductors located on the opposite side of the phosphor. The conductor members of the two perpendicularly oriented grid sets on either side of the phosphor thus establish a matrix comprised of a number of cross-over points which have a phosphor segment disposed therebetween. Switching means are provided to establish a potential difference between one conductor in each of the two grid sets, whereby the phosphor disposed at the point of cross-over of the two conductors will be excited to illuminate the phosphor cross-over point. The illuminated crosspoint is observed on at least one surface of the display device.

In one embodiment of the display arrangement comprises a switching arrangement including two delay lines for the two mutually orthogonal grid or conductor sets located on either side of the phosphor layer, one of the delay lines being for the set which will be referred to hereinafter as the horizontal grid set, and the other of which delay lines is for the set which is referred to hereinafter as a vertical grid set. The terms horizontal and vertical are, of course, not intended to be limiting as to the actual physical disposition or construction of the units.

Each of the delay lines has a number of taps located at successive increments along its length, each of which is arranged for connection to an associated grid in its associated set. A pulse generator is provided for each delay line, each of which is operative to generate pairs of pulses for coupling to its associated delay or transmission line. The pulses of each pair are caused to travel along the line and to intersect at a selected interval along the line to establish a coincident pulse thereat, the resultant pulse at the point of coincidence being of an amplitude which is substantially larger in value than the amplitude of the individual pulses in the pair, whereby only the grid connected to the tap on the delay line at the point of pulse coincidence is energized. In one embodiment, a pulse generator for a delay line is connected to couple the two pulses of a pair to opposite ends of its associated delay line, a variation in the time of coupling of the pulses to the line effecting variation in the point of coincidence on the delay line, and the energization of a correspondingly different tap. Alternatively, the pulses of a pair may be coupled to the same end of a delay line which is of the reflecting type, the second pulse being timed to meet the reflected pulse at the tap on the line at which coincidence is to occur.

The pulse generators for the two different delay lines are further timed relative to each other. That is, each crosspoint in the matrix is defined by a horizontal and vertical grid which are connected to corresponding taps along the delay lines for the horizontal and vertical sets. Energization of the phosphor located at the crosspoint of a horizontal and vertical grid is effected by coupling two pulses to the horizontal delay line to effect coincidence at the tap connected to the horizontal grid for the crosspoint, and applying two pulses to the delay line for the vertical set to effect coincidence of the pulses at the tap connected to the vertical grid for the crosspoint simultaneously with coincidence of the pulses on the horizontal delay line. Thus four pulses must coincide simultaneously to excite any crosspoint on the matrix.

With proper selection of the values of the pulses and the phosphor excitation level (or with the assistance of suitable biasing means) the portions of the phosphor adjacent the conductors energized by the pulses in their travel along the line will not be illuminated, and only the phosphor at the crosspoint of the two grids or conductors which are excited by the four coincident pulses will be illuminated. The amplitude of the pulses provided by the signal generators may be modulated to provide different degrees of brightness.

In accordance with a novel arrangement set forth in copending application Serial No. 214,886, filed by Leo A. Shanafelt and Quentin H. Joy on August 6, 1962, in obtaining synchronized coincidence of a pair of pulses, any tap on a delay line other than the center tap may be selected by varying the delay time of the pulses for such tap from the delay time which is provided for the two pulses which are coincident at the center tap. Such variation is effected by adding a given time delay to the delay time for one of the pulses and subtracting the same time delay from delay time of the other pulses. By adjusting the time of generation for both pulses of the pair on each of the delay lines, the four pulses which select any point on the matrix will always coincide at the same predetermined time "TC" subsequent to the triggering or sync signal.

As noted above, each grid, such as a grid in the horizontal set, is selected by effecting coincidence of a pair of pulses at an interconnected tap on the associated one of the delay lines. Accordingly, a display panel having one-hundred grids will require a delay line having one-hundred taps. While such arrangement is practical, it is apparent that as the number of grids in the display panel increases to larger values, such as for example, five-hundred grids, the larger number of taps on the delay line require that the taps be located more closely to each other on the line, or alternatively, a delay line of a considerably longer length be used. If the smaller length delay line is used, selection by the coincident pulses becomes more critical in that coincidence must occur at a correspondingly reduced interval on the delay line to prevent the energization of more than one tap at a time. Moreover, if a longer delay line is used, the bandwidth and form factor of the device may become impractical. It is thus apparent that the demands on the delay lines and pulses for high resolution displays are quite severe.

It is an object of the present invention, therefore, to provide a novel arrangement in which the demands on the delay line are materially reduced, and it is a specific object of the invention to provide an arrangement in which a given resolution is readily obtained with a substantially reduced number of taps on each delay line.

As shown hereinafter, the object of the invention is basically achieved by providing a digital arrangement wherein two switches (delay lines) are used for each set of a predetermined number of grids. In one embodiment having a set of one hundred grids, each delay line was provided with ten taps, one delay line being connected as a units switch and the other being connected as a tens switch. Thus, in the case of the tens switch, the first group of ten conductors 00–09 is connected to a first tap on the tens switch, the second group of ten conductors 10–19 is connected to the second tap, etc. In the case of the units switch, the grid of each group of ten grids, which has the units digit designated "0," is connected to the tap assigned to represent the digit "0" on the units switch, the grid having the designation "1" is connected to the tap assigned to represent the digit "1," etc. In other arrangements, as shown hereinafter, the units group is comprised of a number of grids other than ten.

In one operable device in which four-layer diodes are used as gates, opposite phase power is applied to the units and tens switches so that as a grid is selected, power appears on only the one grid. Energization of the twenty-first grid of a set of one hundred grids, for example, is effected by exciting the tap (20–29) of the tens switch negatively, while simultaneously applying a positive voltage over the tap "1" on the units switch. Full voltage thus appears only on grid "21" of the set controlled by the two switches. In a crossed grid arrangement which includes a horizontal set of one-hundred grids and a vertical set of one-hundred grids, four delay lines are connected in such manner.

In yet another arrangement, diode gates are connected to the delay lines to operate to cutoff whenever a coincident pulse is generated on the line adjacent to the point of connection of the diode. Grid 21 is thus energized by exciting the tap (20–29) on the tens switch with a coincident signal of a given polarity, and exciting the tap "1" on the units switch with a coincident pulse of like polarity. With the simultaneous energization of these taps, the adjacent diodes are biased to cutoff to provide a potential pulse on grid 21.

In each of these various embodiments, time delay lines having ten taps each thus replace single delay lines having one-hundred taps, and the complexity of the system is greatly reduced. Further the critical selection requirements for the coincident pulses are substantially minimized to provide an arrangement of increased reliability and accuracy in the selection of the different grids on the display device.

It is a further object of the invention to provide a novel arrangement which minimizes the possibility of crosstalk between the grids in the novel arrangement utilizing the tens and units delay line switches.

It is yet another object of the invention to provide a novel solid state panel which utilizes the digital structure to provide a new and novel bar graph display device.

It is a specific object of the invention to provide a digital arrangement in which the number of taps required on each delay line used in coincident pulse selection of grids is reduced to the square root of the number of lines to be selected on the display. As shown hereinafter, in a four square display, a 525 x 525 element display requires twenty-three taps per line; a 1000 x 1000 line display requires thirty-two taps per line; etc.

These and other objects of the invention will be apparent from the following description and accompanying drawings which serve to illustrate the various exemplary embodiments thereof in which:

FIGURE 3 is a block diagram of the manner in which such arrangement is modified to incorporate the novel digital switching structure of the present invention;

FIGURE 3A is a detailed schematic of the manner of connection of the ends of the grids to the delay lines shown in FIGURE 3;

Figure 2:
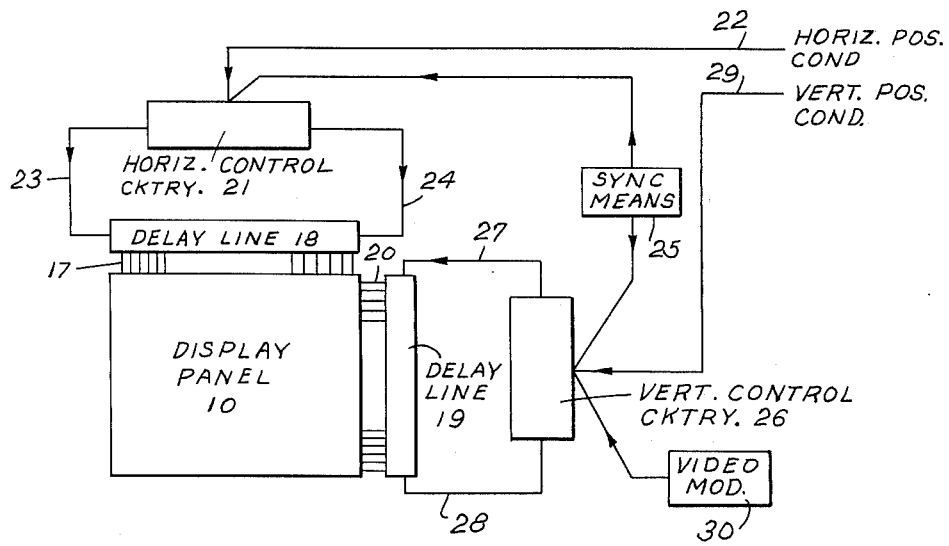
FIGURE 2 is a block diagram of the switching equipment as set forth in the copending application for effecting selective energization of the points on the electroluminescent cross-grid panel of FIGURE 1.
Figure 6:
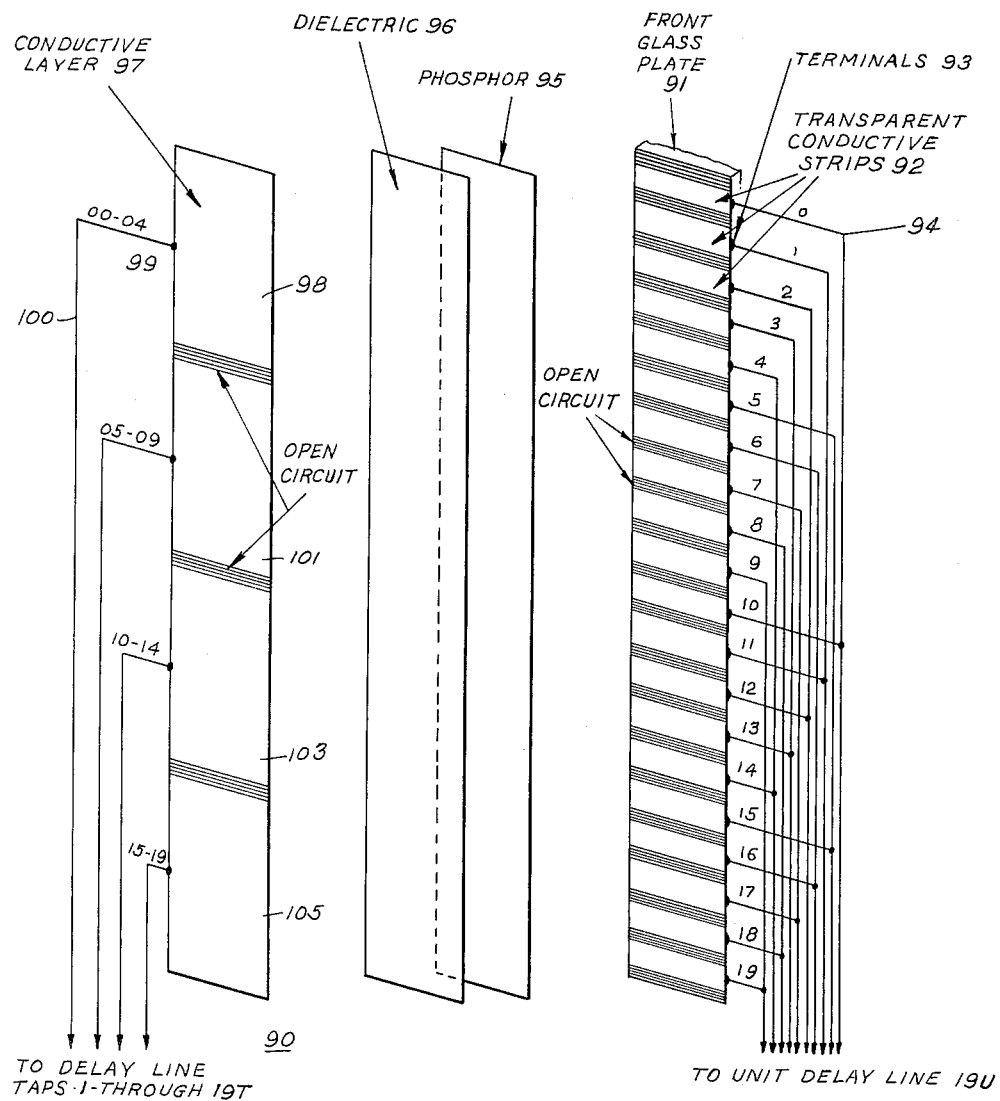

FIGURE 4 sets forth a basic gating circuit which may be used with the two delay lines in the control of a set of grids according to one embodiment of the invention;

FIGURE 5 sets forth in more detail a circuit illustrating the manner in which the basic gating circuit of FIGURE 4 is connected to the units and tens delay switches in a digital system;

FIGURE 6 sets forth a novel solid state bar graph especially adapted for use with the digital switching structure of the invention; and FIGURE 7 sets forth a novel pulse generator which may be used in the control circuitry of FIGURE 2.

GENERAL DESCRIPTION OF DISPLAY DEVICE

Figure 1:
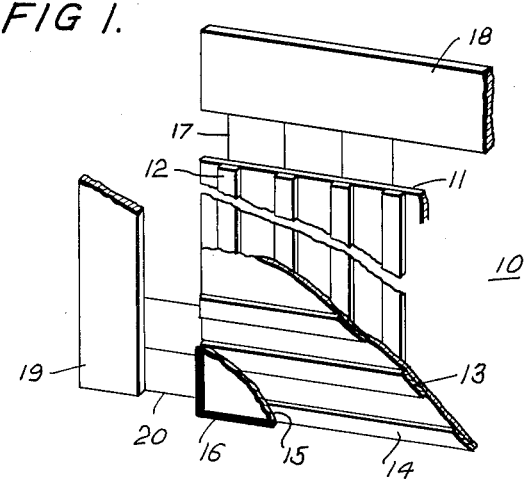
FIGURE 1 is a schematic, sectional illustration of a cross-grid electroluminescent panel illustrating the horizontal and vertical grid sets therein, and a delay line having taps connected to the different grids on one of the panel sets.

With reference to FIGURE 1, the novel display system including a display device 10 and an associated delay line switch is schematically shown thereat. As shown in FIGURE 1, the electroluminescent panel 10 may be a cross-grid panel of any type of a number of well known arrangements, such as shown in the above identified copending application, Livingston Patent 2,774,813, Peek Patent 2,818,531, and others. In the present embodiment, the support member 11 comprises a commercially available substrate, such as a glass panel, precoated with stannic oxide to provide a transparent, conductive film having a resistivity of approximately 100 ohms per square. A plurality of parallel vertical conductor strips 12 are formed by electric arc etching through the stannic oxide film. The conductor may also be prepared from many other materials including stannic chloride and titanium dioxide, by using deposit techniques well known in the art. A film of electroluminescent phosphor 13 is deposited over the vertical strips, which film may comprise a crystalline film, or a dielectric suspension of phosphor particles or any other well-known form of phosphor screen. In certain embodiments, a thin insulator or dielectric layer is applied over the phosphor layer.

A set of horizontal conductor strips 14 is deposited over the phosphor layer (and dielectric layer if included) which strips may be similar to the vertical conductor strip 12. In one embodiment, the horizontal conductors were formed in the dielectric layer by vacuum evaporation of pure aluminum through a mask and spraying a protective plastic film coating over the aluminum. If desired, variable resistance or rectifier areas (not shown) may be located between the horizontal conductor strips 14 and the phosphor layer. A glass member (or plastic spray) 15 may be used as a back cover plate for the structure, and suitable light containing members 16 may be located along the edges to minimize the introduction of light through the glass edges into the display area. Metal contacts are fastened to the ends of the electrode elements to provide for external connection to taps on the delay lines, such as lines 18, 19.

As shown in FIGURE 1, conductor members 20 connected to the ends of the horizontal conductors 14 extend beyond one marginal edge of the display device for connection to individual taps on delay line 19, which may be a flat-plate delay line, a toroid-capacitor delay line, or any of a number of well-known types of lines which are readily adaptable to tapping at successive intervals along its length, and which has transmission characteristics related to the pulse transmission rates required for the displays to be provided. If a strip delay line is used, such as for example, a bar of barium titanate, the conductors 20 are made of an extremely thin physical structure and may be extended between the horizontal conductors 14 and the taps on the delay line 19 to improve the resolution capabilities of the system by reducing the segment on the line 19 contacted by the conductors 20, and thereby the segment which is responsive to a coincident pulse on the delay line 19.

A delay line 18, similar to delay line 19, has a plurality of taps disposed at successive increments thereon, and conductors 17 couple successive ones of the vertical conductors 12 to successive ones of the taps on delay line 18.

With reference to FIGURE 2, the switching arrangement shown in the copending application for energizing the display device of FIGURE 1 is schematically illustrated thereat. A horizontal position input lead 22 couples voltages to horizontal control equipment 21 which are representative of the horizontal coordinates of the data to be displayed, and two output circuits 23, 24 are connected from the control equipment 21 to the opposite ends of the horizontal delay line 18. A horizontal control circuit 21 couples a first signal of a pair over conductor 23 and a second signal of the same pair over conductor 24, the time of generation and coupling of the output pulses of each pair to opposite ends of the delay line over conductors 23, 24 determining the point of coincidence of the pulse on the delay line, and thereby the one of the conductors 17 selected by the pair of pulses applied to delay line 18.

Alternatively, as shown in one of the arrangements set forth in U.S. Patent 2,955,231, the switching system may be of the reflective type, in which the two output pulses of each pair of pulses provided by the horizontal control circuit 21 are coupled to the same end of the line. In one reflective arrangement disclosed thereat, the first pulse travels the length of the delay line and is reflected, and the second pulse of each pair is timed to meet the first pulse in its reflected travel along the delay line 18 at the one of the taps to the selected by the resultant coincident pulse.

Vertical control circuitry 26 couples a first pulse of a pair over output conductor 27 to one end of the vertical delay line 19, and a second pulse of the pair over conductor 28 to the other end of delay line 19. A vertical position input circuit 29 couples voltage signals to the vertical control circuitry 26 indicative of the vertical coordinate of the data to be displayed, and vertical control circuitry 26 responsively controls the time of coupling of the pulses of each pair over output conductors 27, 28 to the opposite ends of delay line 19 to thereby effect coincidence of the pulses of the pair at the one of the conductors 20 which passes through the vertical coordinate represented by the vertical position signal.

Sync means 25 are operative to effect relative timing of each pulse of each pair provided by the horizontal and vertical control circuitry 21, 26 for the horizontal and vertical delay line 18, 19, and are further operative to insure that the pulse pair on the horizontal delay line 18, and the pulse pair on the vertical delay line 19 coincide at the desired points on the lines 18, 19 at the same time relative to each other. As noted above, sync means 25 is operative to control coincidence of the two pulses on delay line 18 and the two pulses on delay line 19 at the same predetermined time interval $t_c$ after (or before) a sync pulse.

The brightness of the point selected by the four pulses is determined by the amplitude of the pulses. As shown hereinafter, the horizontal and vertical control circuits 21, 26 provide positive and negative pulses respectively, whereby the four pulses in coincidence result in the application of a potential difference of even larger amplitude across the phosphor 13. Further, video modulation input circuit 30 may be connected to adjacent the amplitude of the output pulses of the horizontal and/or vertical circuitry 21, 26 to different values to thereby modulate the brightness of the display at the selected point to the value indicated by the received signals.

DIGITAL SELECTION STRUCTURE

A. *Tens and units groups of tens*

According to one embodiment of the novel invention, the horizontal grids and the vertical grids on the display device are divided into groups of one hundred conductors, each one hundred conductors being divided into groups of ten. A pair of delay lines is provided for each group of one-hundred horizontal grids. Each delay line includes ten taps, the first delay line of each pair being connected as a tens switch and the second delay line of each pair being connected as a units switch. Each grid on the panel is connected to the taps on the tens and units switches for its set which corresponds to its assigned position in the grid set. Selection of a grid is effected with the simultaneous selection on the tens and units switch of the taps to which the conductor is connected.

With reference now to FIGURE 3, one embodiment of the novel digital selection structure is shown thereat. As in the embodiment shown in FIGURE 1, the arrangement includes a horizontal position input lead 22 which couples voltages to horizontal control equipment 21 representative of the horizontal coordinates of the data to be displayed. A first output circuit extends over conductor 60 to the double pulsers 48L, 48R which are in turn connected over pulse drivers 56, 58 and conductors 23, 24 respectively to opposite ends of a "tens" delay line 18T for the vertical conductor set. Tens delay line 18T includes ten taps, identified as taps 0–9, 10–19, 20–29 . . . 90–99. Tap 0–9 is connected common to the first ten vertical grids on the panel 10, the second tap 10–19 is connected common to the second group of ten vertical grids, etc. The connection of each common tap, such as 0–9, to the group of ten conductors associated therewith is effected, as shown in FIGURE 3A, over individual diodes, such as 62a–62j. Each of the other groups of ten conductors is coupled to its common tap in a similar manner.

The horizontal control circuit 21 is also connected over conductor 61 to double pulser 64 which includes a first section 64L connected over pulse driver 65 to one end of a "units" delay line 18U for the vertical grid set and a second section 64R connected over pulse driver 66 to the opposite end of units delay line 18U.

Units delay line 18U includes ten taps identified as units taps 0–9, tap 0 being connected to the "zero" or first grid in each group of ten grids, i.e., grids 0, 10, 20, 30 . . . 90. In a similar manner, the tap for units digit 1 is connected to grid 1 (the second grid) in each group of ten grids, i.e., grids 1, 11, 21 . . . 91. As shown in FIGURE 3A, the connection of the grids in the different groups to a common tap, such as tap 0, tap 1, etc., on the units delay line 18U is effected over individual diodes, such as 69a–69j, etc.

A grid in a set, such as the twelfth grid V12 in the vertical grid set, is thus connected over diode 62m to tap 10–19 on tens delay line 18T and over diode 69m to the units tap 2 on units delay line 18U, and as shown in more detail hereinafter the twelfth vertical grid V12 is energized by a given signal responsive to the simultaneous selection of tens tap 10–19 on tens delay line 18T and the units tap 2 on units delay line 18U.

The vertical control circuitry 26 for determining the vertical position of the spot to be energized is controlled by signals coupled over the vertical input position conductor 29. Vertical control circuitry 26 is in turn coupled over conductor 63 to double pulser 26L, 26R for a tens delay line 19T associated with the horizontal grid set, and also over conductor 71 to double pulser 72R, 72L for a units delay line 19U for the horizontal grid set.

The left hand section 26L of pulser 26 is connected over pulse driver 34 and conductor 27 to one end of tens delay line 19T, and the second section 26R of pulser 26 is connected over pulse driver 36 and conductor 28 to the opposite end of the tens delay line 19T.

The left hand section 72L of pulser 72 is connected over pulse driver 73 and conductor 74 to one end of units delay line 19U, and the second section 72R of pulser 72 is connected over pulse driver 75 and conductor 76 to the opposite end of the units delay line 19U.

With reference to FIGURE 3, it will be apparent that the horizontal grid set is divided into groups of ten—0–9, 10–19, etc., and the taps 0–9 . . . 90–99 on the tens delay line 19T and the taps 0–9 on the units delay line 19U are connected to the horizontal grids in the same manner as the taps on the tens and units delay line 18T, 18U are connected to the vertical grids.

B. *Selection of a point on display panel 10*

For exemplary purposes, it will now be assumed that the point on display panel 10 (see star signal in FIGURE 3) defined by the intersection of the twelfth vertical grid (third grid in second group of ten vertical grids) and the ninetieth horizontal grid H90 (first grid of tenth group of ten horizontal grids—FIGURE 3) is to be energized. To effect energization of the twelfth vertical grid V12, a voltage signal is coupled over horizontal position conductor 22 to the horizontal control circuitry 21 which is of a value to indicate that selection of the twelfth vertical grid V12 is desired. Horizontal control circuitry 21 in turn couples a voltage signal over conductor 60 to double pulser 48L, 48R, of a value to effect generation of a first and a second pulse for coupling to opposite ends of delay line 18T which are operative to coincide at the second tap (10–19) on delay line 18T at a predetermined time TC after sync. The value and nature of the signal extended to double pulser 48 to effect selection of a specific tap on delay line 18T is described in detail in the above-identified copending application.

Simultaneously, horizontal delay circuitry 21 also transmits a voltage signal over conductor 61 to double pulser 64 to control the pulser in the transmission of pulse pairs to opposite ends of delay line 18U which coincide at the third tap (2) on delay line 18U at the same predetermined time interval TC after sync. With simultaneous coincidence of the pair of pulses at the second tap (10–19) on delay line 18T and coincidence of the pair of pulses on the third tap (2) on delay line 18U, diodes 62m and 69m are biased to cutoff to provide a voltage signal on the twelfth vertical grid V12, which is in the order of twice the amplitude of the pulses on the individual delay line. Since the coincident pulses appear only at the second tap (10–19) on delay line 18T and only at the third tap (2) on delay line 18U, only the twelfth vertical grid will be energized by a voltage twice the value of the indicated pulses that appear on the lines 18U, 18T. It should be noted that the voltage which appears on the twelfth vertical grid V12 is still insufficient by itself to effect energization of the phosphor which lies adjacent thereto.

It will be recalled that the spot to be energized in the present example is defined by the intersection of the twelfth vertical grid V12 and the ninetieth horizontal grid H90. Selection of the ninetieth horizontal conductor H90 is effected by a signal which is applied over vertical position conductor 29 to vertical control circuitry 26 which in turn provides voltage signals over conductors 63 and 71 to pulsers 26 and 72 to effect selection of horizontal grid H90.

More specifically, vertical control circuitry 26 couples a voltage signal over conductor 70 to the double pulsers 26L, 26R, and the pulsers generate a pair of pulses in the manner described in the previous application for transmission over pulse drivers 34, 36 and conductors 27, 28 to opposite ends of tens delay line 19T to control the same to coincide at the tenth tap (90–99) on the tens delay line 19T at the predetermined interval TC after sync.

Vertical control circuitry 26 also transmits a voltage signal over conductor 71 of a value to control the double pulser 72 to effect the transmission of a first and second pulse over pulse drivers 73, 75 and conductors 74, 76 respectively to opposite ends of units delay line 19U in timed relation to coincide at the first tap thereof (0) at the predetermined time TC after sync.

With the simultaneous energization of the tens tap (90–99) and the units tap (0), horizontal grid H90 is energized by full voltage in the manner of, and simultaneous with the twelfth vertical grid V12. The phosphor in the display panel 10 has a resistance such that the voltage of one grid alone in either set is insufficient to illuminate the phosphor, and of a value which will excite responsive to the coupling of full voltage to a grid in both the horizontal set and the vertical set. The energization of the twelfth vertical grid V12 and the ninetieth horizontal grid by full power in the manner described results in the energization of the spot of phosphor which is located at the intersection thereof (see star symbol in FIGURE 3).

Two delay lines having ten taps thus replace one delay line having one-hundred taps, and greater accuracy in selection is accomplished thereby.

According to one embodiment of the invention, the grids are divided into groups of twenty so that any possible crosstalk between the tens and units conductors will not affect a line in a group other than the group which is energized by the switches. That is, if tap 20–29 is energized on the tens line 19T, the tap "1" is energized on the units line 19U to select tap 21, there is a possibility in some arrangements that crosstalk might occur over the corresponding units conductor in the adjacent "tens" groups (conductors 11 and 31, in the present example). However, if the tens switch, such as 19T, has twenty taps, each group of lines will include five grids, and with selection of grid 21 "adjacent" channel crosstalk would affect only the group of lines 15–20 and the group 25–30 which are the groups on either side of the selected groups 21–24. Since there is no other conductor in the two adjacent groups (15–20 and 25–30) which has the units designation "1" of energized grid 21, the possibility of crosstalk is substantially minimized in such arrangement.

C. *Gate structure for digital switches*

In a further embodiment of the invention, a plurality of gate circuits are used to control the tens and units switches in the selection of the desired grids. That is, each grid on the display panel 10 is provided with an associated gate which is connected to the corresponding taps on the tens and units delay line switches for its associated set.

In one such arrangement, pulses on the units delay line for a set of grids are of opposite polarity to the pulses on the tens delay line for such set. Further, the pulses on the delay lines for the vertical set are opposite in polarity to those on the corresponding delay lines for the horizontal set. The positive-going scanning pulse on the horizontal units delay line is transmitted through the selected tap on the delay line, and the gate circuit connected thereto is operative only responsive to the simultaneous receipt of a negative-going scanning pulse over the interconnected tap on the horizontal tens delay line tap. In a similar manner, a negative-going scanning pulse on the vertical units delay line tap is transmitted over the selected tap, and its associated gate circuit operates only as controlled by the positive-going scanning pulse from the tap on the vertical tens delay line which is connected thereto. Opposite polarity pulses thus appear at the point defined by the selected ones of the horizontal and vertical grids to effect the excitation of such point on the panel.

More specifically, with reference now to FIGURE 4, one simplified gate circuit arrangement designed for such use is shown thereat, and as there illustrated, each gate comprises a PNPN four layer diode device, such as diode 80, for an associated grid, such as the twelfth horizontal grid H12 on the display panel 10.

The four layer diode gate 80 for the horizontal grid H12 on the display panel 10 has one terminal connected to the second tap "2" on the units delay line 19U, and its second tap connected to the horizontal grid line H12 and also over resistor 84 and a capacitor memory circuit 85 including capacitor 86 and diode 87 to the second tap (10–19) of tens delay line 19T.

Assuming a control circuit, such as shown in FIGURE 3, as the vertical control circuit 26 extends signals over conductors 63, 71 to double pulsers 26 and 72 respectively, of a value to indicate selection of horizontal line grid H12 is desired, the double pulser 26 generates a pair of pulses which coincide at the second tap 10–19 on tens delay line 19T, and double pulser 72 generates a pair of pulses which coincide at tap "2" on units delay line 19U. The double pulse (negative-going) on the tens line 19T induces a voltage in the capacitor memory circuit 85 including diode 87 and capacitor 86 which is of sufficient magnitude to produce a control voltage on the lower terminal of diode gate 80. With the appearance of the units pulses at tap "2" of units switch 19U (positive-going) on the other terminal of diode gate 80, the gate 80 operates to transmit the positive-going units pulse to the horizontal grid line H12.

The delay lines 18T, 18U for the set of vertical grids are controlled in a similar manner, the pulse on the units delay line 18U which is coupled to the grid selector by the energized gate being of a negative-going polarity (i.e., opposite polarity to the units pulse coupled to the selected horizontal grid).

As shown in FIGURES 4 and 5, tap 2 on units delay line 19U is multipled to the four-layer diode gates for each of grid lines in the different tens groups which have the units digit 2, 12, 22 . . . 92. The tap 10–19 on tens delay line 19T and its associated capacitor memory circuit 85 are multipled to each of the grid lines in the same tens group, i.e., 10,11, 12 . . . 19. The manner in which the gates are connected to the grid lines of a display panel, such as 10, is best shown in FIGURE 5.

In that the scanning pulses which appear at taps on the tens line 19T serve only to induce a control voltage in the storage circuit, such as 85, and condition the gates, such as gates 80, 81, etc., connected to such storage circuit and taps for passage of the units scanning pulse which appears at one of the taps on the units line 19U, the timing tolerances of the system are rendered somewhat less critical and the pulses can be of increased width. Thus the tens scanning pulse need appear in the memory circuit 85 for the selected tens group only briefly before the units pulse appears on the terminal of the gate selected by the units pulse.

SOLID STATE STRUCTURE UTILIZING DIGITAL SWITCHING ARRANGEMENT

A novel solid state bar graph device which incorporates the digital techniques of the disclosures is set forth in FIGURE 6. As there shown, the display panel 90 includes a front glass plate 91 comprised of a commercially available substrate precoated with stannic oxide transparent conductive film. A plurality of parallel horizontal conductor strips, such as 92, are formed by electric arc etching through the stannic oxide film to provide adjacent, electrically spaced, parallel, horizontally extending conductor strips 92 at successive intervals along the length of the glass plate 91. Each such strip is assigned a successive number, and as shown in the embodiment of FIGURE 6, the top conductor strip is assigned digit 0, the second strip digit 1, etc. Terminals 93 are connected to one end of each of the strips 92 to permit connection thereof over electrical conductors 94 to corresponding units taps on a units delay switch, such as delay line 19U shown in FIGURE 3.

A film of electroluminescent phosphor 95 is deposited over the parallel strips which may comprise a crystalline film, a dielectric suspension of phosphor particles, or any other well-known form of phosphor screen. A thin insulation or dielectric layer 96 with high dielectric strength may be applied or sprayed over the phosphor layer 95. A conductive layer 97 is deposited over the dielectric layer 96, which layer is sprayed over the phosphor layer 95. A conductive layer 97 is deposited over the dielectric layer 96, which layer is comprised of a plurality of groups of electrically separated rectangular sections which may be formed on the dielectric layer 96 by vacuum deposit of pure aluminum through a mask. A protective plastic film coating (not shown), may be applied over the aluminum. Metal contacts 99 are fastened to the ends of each of the electrode elements, such as 98, for connection over conductors, such as 100, to corresponding taps on the tens delay line, such as illustrated tens delay line 19T in FIGURE 3.

The size of the rectangular areas 98, 101, etc., in the conductive layer 97 is directly related to the number of units conductors which are assigned to each group in the digital arrangement. Thus, if each group is to comprise ten conductors as in the previous described embodiments (0–9, 10–19, etc.), a rectangular section, such as 98, would be of a length which is coextensive with the conductors 0–9 provided by the conductor strips 92 on the front glass plate 91. In the embodiment disclosed in FIGURE 6, delay line 19T is provided with twenty taps, and each group of 100 conductors is divided into groups of five, i.e., 00–04, 05–09, 10–14, 15–19, etc. The successive rectangular areas 98, 101, 103, 105, etc. in such arrangement are therefore coextensive with the five corresponding conductor strips on the front glass plates 91 which are assigned to the group represented thereby i.e., rectangular area 98 which is connected to the first tap (00–04) on a tens delay line, such as 19T, is coextensive with the strips on the front glass plate 91 which represent conductor lines 0–4, rectangular area 101 is coextensive with strips 5–9, rectangular area 103 is coextensive with strips 10–14, etc.

In operation, assuming that strip 12 is to be energized, the pulser for the tens delay line 19T is operative to select the third tap on the delay line, and the rectangular section 103 will be energized by a pulse of negative polarity. Simultaneously, the pulser for the units delay line is operative to select the second units tap "2" (the third tap on a units delay line, such as 19U) with a pulse of a positive polarity, and the section of phosphor layer 95 coextensive with strip 12 will be excited to provide a linear display.

It is apparent that the foregoing arrangement in which each of the groups includes five conductors results in better definition for a given pulse characteristic, and smooth transition from one group of ten units to the next group of ten units.

The novel device provides a bar graph having excellent trace ratio, small package size, low power consumption, minimum heat generation, high linearity and effects such advantages while yet eliminating much complex circuitry.

PULSE GENERATOR

As noted herein the pulse generator circuitry may be that set forth in the above identified copending application of Leo A. Shanafelt and Quentin F. Joy. However, in certain embodiments it may be desirable to operate in the nano-second range, and to provide sufficient energy to drive the solid state delay lines in effecting the switching in such range. Various methods include trigger blocking oscillators, silicon transistors operated in the avalanche mode, nonlinear delay lines, and others.

One particularly successful circuit which was operable in the nano-second range is set forth in FIGURE 7. The pulse generator 110 shown thereat includes an input circuit 111 including capacitor 112 and diode 113 which is shunted by inductance 114 and adjustable resistor 115 to ground. Differentiating circuit 116 including capacitor 117 and resistor 118 are coupled to an output circuit 119. A diode clipper 120 and an RC circuit including resistor 121 paralleled by capacitor 123 are connected between the output circuit 119 and ground.

In operation, an oscillator driving source having a frequency range of from 1–10 megacycles is coupled to the RF input circuit 111 for the pulse generator 110. The silicon diode 113 exhibits the "Boff" or snap-off effect due to the junction capacity and majority carrier storage time, the carrier mobility of the silicon diode being a factor contributing to the Boff snap-off effect. The capacitor 112 is charged by the forward conduction of the diode and an average junction reversed bias is established by the controlled discharge of the capacitor 112, to thereby permit control of the reverse voltage point at which the Boff effect occurs, and at the same time provide adjustment means for effecting maximum output amplitude.

The output signal from the diode is coupled over differentiating circuit 116 to remove the RF excitation signal, and thereby provide a reasonably flat base line output signal over output circuit 119.

In that the differentiating circuit 116 has a typical backswing energy, the diode clipper 120 is coupled over a series resistor 121 to absorb the back-swing energy, the resistor being dimensioned to prevent any loading of the desired signal due to saturation current which might interfere with the response characteristics of the clipper diode 120.

The pulse generator 110 is capable of producing pulse power input at a voltage amplitude nearly four times the peak to peak value of the input signal in a relatively low output impedance circuit.

A particular advantage of such circuit is the elimination of a power supply in that the characteristics of the Boff diode are such as to change power in relation to time, whereby the average power is nearly constant.

CONCLUSION

It will be apparent that there is set forth herein a novel switching arrangement which permits the selection of a number of different control means, such as circuits or conductors, in a more expeditious and reliable manner with a reduced amount of equipment. Such arrangement is particularly useful in switching arrangements for display devices and other electronic equipment which require extremely fast switching with a minimum of selection equipment.

While certain preferred embodiments of the invention have been shown and described herein, it is apparent that modifications and alterations may be made which include the basic concepts of the invention, and it is intended in the appended claims to cover all such modifications and alterations as may fall within the true spirit and scope of the invention.

What is claimed is:

1. In a display device having a crossed grid structure for energizing different points of a light emitting media including a first and a second set of conductors disposed in circuit controlling relation with each other and said light emitting media, switching means for each of said conductor sets, each of which includes a first and a second transmission line, a plurality of taps on each line, means for connecting the conductors of each set in groups, each group in a set being connected to a different tap on the first transmission line for the set, means connecting each conductor in a group of a set to a different tap on the second line for the set, and means for selectively and simultaneously energizing one tap on each of said four lines to thereby selectively energize a corresponding conductor in each of said sets and the light emitting media controlled by the energized conductors.

2. In a display device having a crossed grid structure for energizing different points of a light emitting media including a first and a second set of conductors disposed in spaced relation with each other and with said light emitting media disposed therebetween, switching means for each of said conductor sets, each of which includes a first and a second transmission line, a plurality of taps on each line, means for connecting the conductors of each set in groups, each group in a set being connected to a different tap on the first transmission line for the set, means connecting each conductor in a group of a set to a different tap on the second line for the set, and means for selectively and simultaneously energizing one tap on each of said lines for each set to thereby selectively energize one conductor in each of said sets, the energizing signal on one conductor alone being less than the energizing threshold of said light emitting media.

3. In a display device having a crossed grid structure for energizing different points of a light emitting media including a first and a second set of conductors disposed in spaced relation with each other and with said light emitting media disposed therebetween, switching means for each of said conductor sets, each of which includes a first and a second transmission line, a plurality of taps on each line, and connection means including a first means for connecting the conductors of each set in groups, each group in a set being connected to a different tap on the first transmission line for the set, second means connecting each conductor in a group of a set to a different tap on the second line for the set, means for selectively and simultaneously energizing one tap on each of said lines, and means in one of said connection means for each conductor operative to energize the conductor only responsive to the simultaneous energization of the interconnected taps for the conductor.

4. In a display device having a grid structure for energizing different points of a light emitting media including a first and a second set of conductors disposed on opposite sides of a light emitting media, said conductors comprising film layers of conductive material, switching means for each of said conductor sets, each of which includes a first and a second transmission line, a plurality of taps on each line, means dividing the conductors of each set into groups, the conductors in a group in said one set being connected common with each other, means connecting each group in said one set to a different tap on the first line, means for connecting each of the conductors of the corresponding group in the second set to a different tap on the second line, and means for selectively and simultaneously energizing one tap on each of said lines to thereby selectively energize a corresponding conductor in each of said sets and a linear trace on said light emitting media.

5. In a selection switch for selectively enabling means coupled to a junction of a pair of grids of a crossed grid structure comprised of a first and second set of grids arranged perpendicular to each other, a first and a second transmission line for one of said grid sets, each of which lines includes a plurality of taps connected to different intervals along the length thereof, first connection means for connecting a first plurality of said grid members of said one set to the same tap on said first line, and for connecting different pluralities of grid members to different taps on said first line, second connection means for connecting each grid member of said first plurality in said one set to a tap on said second line, different grid members of the same plurality being connected to different ones of said taps on said second line, a first pulse means for selectively energizing each of the different taps on said first line, a second pulse means for selectively energizing each of the different taps on said second line.

means for selectively energizing one grid member in response to simultaneous energization of the connected taps for said one grid on said first and second line by the pulses provided by said first and second pulse means, and means for simultaneously enabling a grid of said second set to enable the associated means at the junction thereof with said one grid.

6. In a selection switch for selectively enabling means coupled to a junction of a pair of grids of a crossed grid structure comprised of a first and second set of grids, a first and a second transmission line for one of said grid sets, each of which lines includes a plurality of taps connected to different intervals along the length thereof, first connection means for connecting one group of said grid members of said one set to the same tap on said first line, and the grid members of each different group to a correspondingly different tap on said first line, second connection means for connecting each grid member of said one group in said one set to a tap on said second line, different grid members of said one group being connected to different ones of said taps on said second line, and pulse means including a first pulse means for selectively energizing one tap on said first line and a second pulse means for simultaneously energizing a tap on said second line, means in said first and second connection means for establishing a predetermined signal on only the one of said grids in said one set which is connected to an energized tap on each of said first and second lines, and means for simultaneously enabling a grid on said second set to enable the associated means located at the junction thereof with said one grid.

7. In a selector switch for selectively enabling each of a plurality of control means, a first and a second transmission line, each of which lines includes a plurality of taps connected to different intervals along the length thereof, first connector means comprising a first gate means for connecting a first group of said control means to the same tap on said first line, and further gate means for connecting each different group of control means to a correspondingly different tap on said first line, second connection means including a second plurality of gate means for each group of control means, each of said gate means of said second plurality connecting a different control means of its group to a different one of said taps on said second line, pulse means for transmitting pulses on said first and second lines to switch one gate means in said first plurality for a predetermined one of said control means and simultaneously the one gate means in said second plurality which is connected to said one control means, and means enabling said one control means only responsive to simultaneous switching of both of its associated gate means.

8. In a selector switch for selectively enabling each of a plurality of conductor members, a first and a second transmission line, each of which lines includes a plurality of taps connected to different intervals along the length thereof, first connector means comprising a first plurality of gate means for connecting a first group of said conductor members to the same tap on said first line, a second connector means including a second plurality of gate means, each of which connects a different conductor member of said first group to a different one of said taps on said second line, and pulse means for transmitting pulses on said first and second lines to simultaneously switch one gate means in said first plurality and one gate means in said second plurality, and means controlled by simultaneous switching of both of said gate means for one conductor member to provide a potential on said one conductor member.

9. A selector switch as set forth in claim 8 in which said one gate means in each of said first and second connector means are normally conductive, and in which said means for energizing said lines effects simultaneous disablement of said one gate means in each of said first and second pluralities.

10. A switch as set forth in claim 8 which includes a memory circuit for said first group of conductor members connected to said same tap on said first line for its associated group.

11. In a selector switch for a plurality of conductor members, a first and a second transmission line, each of which lines includes a plurality of taps connected to different intervals along the length thereof, first connector means, means comprising a first plurality of switching means, each of which is operable between a conducting and non-conducting condition, means for connecting a first group of said switching means to the same tap on said first line, and means for connecting each other group of switching means to correspondingly different taps on said first line, second connector means for connecting each different one of said switching means in said first group to a correspondingly different one of said taps on said second line, means for selectively energizing the taps on said first and second line to which said one switching means is connected, said switching means being operative as energized to extend a potential signal on at least one of said first and second lines to the one of said conductor members which is connected thereto.

12. In a selection switch for use in selectively energizing associated means coupled to a junction of a pair of grids of a crossed grid structure comprised of a first and second set of grids, a first and a second transmission line for one of said grid sets, each of which lines includes a plurality of taps connected to different intervals along the length thereof, connecting means including a first plurality of connector means, each of which means connects a different group of ten grids to a correspondingly different tap on said first line, different ones of said means connecting different tens groups to different taps on said first line, a second plurality of connector means for connecting each group of ten grid members to a tap on said second line, different ones of the second plurality connecting different ones of its associated ten grids to different ones of said taps on said second line, means for selectively energizing one tap on each of said lines, means for energizing the one of said grids in said grid set which is connected to the energized tap on said first line and the energized tap on said second line and means for energizing a grid in said second set to enable the one of the associated means coupled to the junction thereof with said one grid in said first set.

13. In a selection switch for use in selectively energizing one of a plurality of control means, a group selection line and a units selection line for said one switch, each of which includes a plurality of taps connected to successive intervals along the length thereof, means for connecting a first group of said control means to the same one of said taps on said group selection line, further means for connecting each different group to a correspondingly different one of said taps on said group selection line, means for connecting each control means of one group to a tap on said units selection line, different control means of said group being connected to different ones of said taps on said units selection line, and selection means for selectively energizing one of said control means including group selection means for coupling a first and a second pulse to said group selection line timed to meet at the tap to which said one group of control means is connected, and unit selection means for coupling a third and fourth pulse to said second line timed to meet at the tap thereof to which the desired one of said control means is connected, the coincidence of said four pulses being simultaneous to effect energization of the selected unit in the selected group.

14. In a display device having a grid structure for energizing different points of a light emitting media including a first and a second set of conductors disposed in spaced relation with each other, switching means for each of said conductor sets, each of which includes a first and a second transmission line, a plurality of taps on each line, means for each set connecting a group of said grids in its set to the same tap on the first transmission line for its set, means for each set connecting the grids of said group in each set to different taps on the second transmission line for its set, and means for selectively and simultaneously energizing one tap on each of said four lines to thereby selectively energize a grid in each of said sets and the light emitting media which is located between the energized grids.

References Cited by the Examiner
UNITED STATES PATENTS

| | | | |
|---|---|---|---|
| 2,729,811 | 1/1956 | Gloess | 340—167 |
| 2,904,626 | 9/1959 | Rajchman et al. | 178—5.4 |
| 2,955,231 | 10/1960 | Aiken | 315—169 |
| 3,105,197 | 9/1963 | Aiken. | |

NEIL C. READ, *Primary Examiner.*

P. XIARHOS, H. I. PITTS, *Assistant Examiners.*